United States Patent [19]

Curchod et al.

[11] 4,297,882
[45] Nov. 3, 1981

[54] WHEEL BALANCER TRANSDUCER MOUNT WITH IMPROVED SIGNAL TO NOISE RATIO

[75] Inventors: Donald B. Curchod, Saratoga; Donald R. Sherman, San Jose, both of Calif.

[73] Assignee: Autotron Equipment Corporation, Mountain View, Calif.

[21] Appl. No.: 143,430

[22] Filed: Apr. 24, 1980

[51] Int. Cl.³ .............................................. G01M 1/16
[52] U.S. Cl. ......................................... 73/460; 73/473
[58] Field of Search ............................... 73/462–465, 73/460, 466, 487, 473, 477

[56] References Cited

U.S. PATENT DOCUMENTS 4,085,619   4/1978   Shapiro et al. .......................... 73/462
4,177,678   12/1979   Harant .................................... 73/460

Primary Examiner—James J. Gill

Attorney, Agent, or Firm—Flehr, Hohbach, Test, Albritton & Herbert

[57] ABSTRACT

A transducer mount for a wheel balancer having a shaft and a drive belt which approaches the shaft from a given direction. A bearing block for the end of the shaft adjacent the drive belt is supported by a passive mount aligned with the given direction and an active mount spaced from the passive mount so that vibrations in the belt drive produce no moments about the passive mount that are sensed by the active mount. The wheel/tire assembly is attached to the end of the shaft remote from the belt drive, and there is a bearing block adjacent the wheel/tire assembly which is supported by an active mount and a passive mount that are spaced from one another by a distance greater than the space between the active mount and the passive mount for the bearing block adjacent the belt drive, thereby to increase the amplitude of forces applied to the active mount that is spaced farther from the wheel/tire assembly.

6 Claims, 4 Drawing Figures

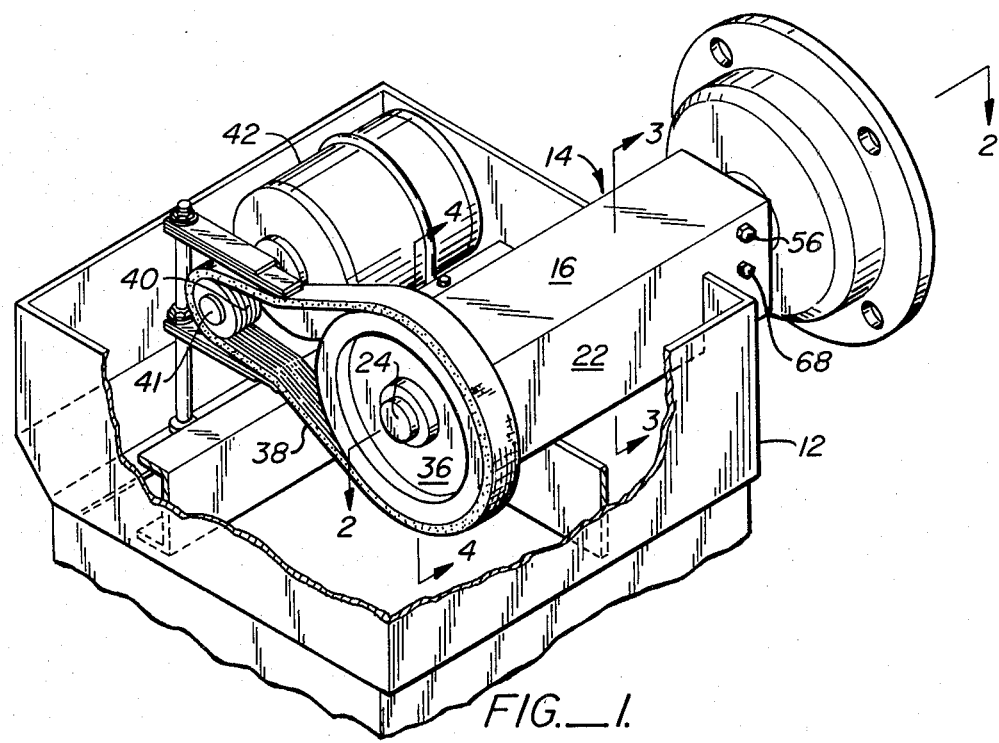
FIG._1.
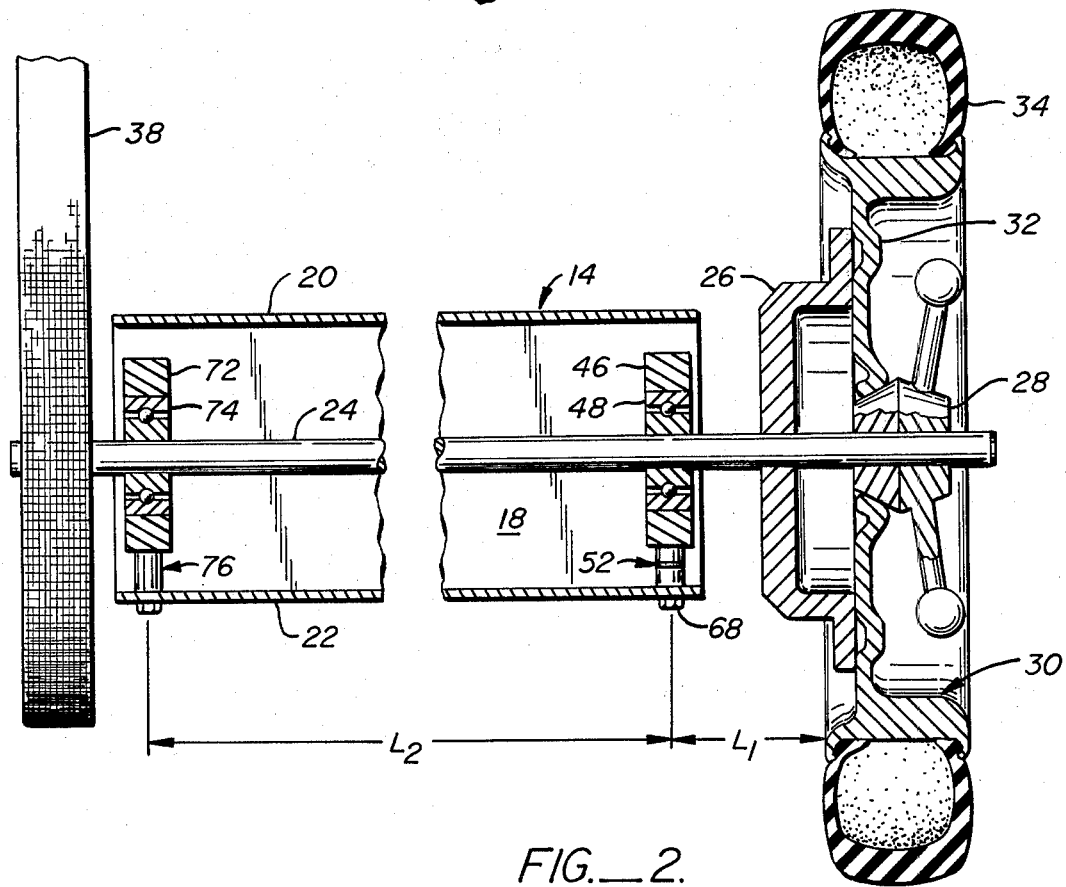
FIG._2.

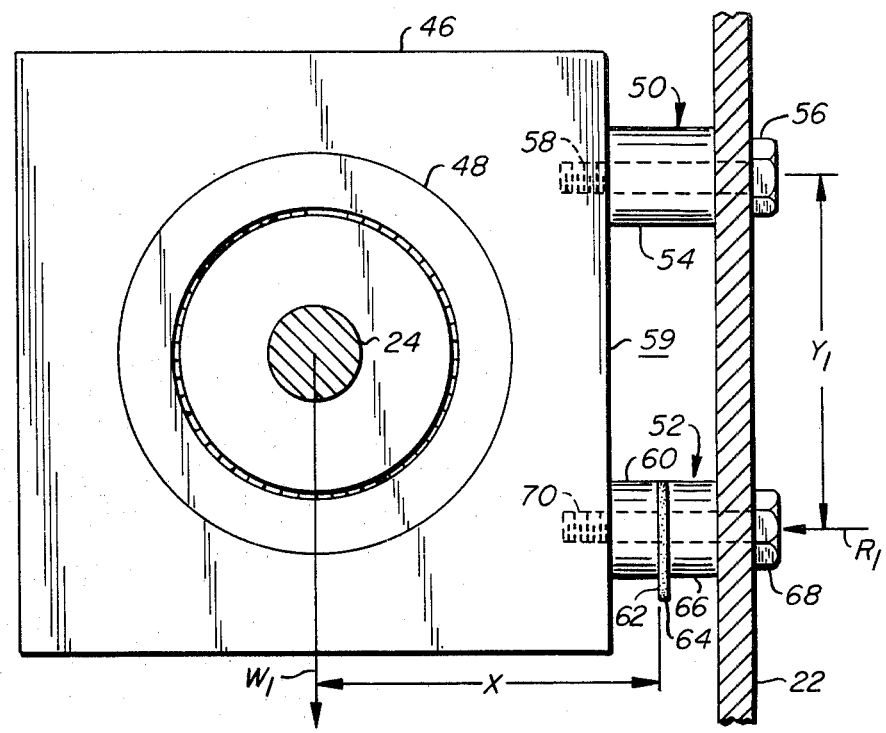
FIG._3.
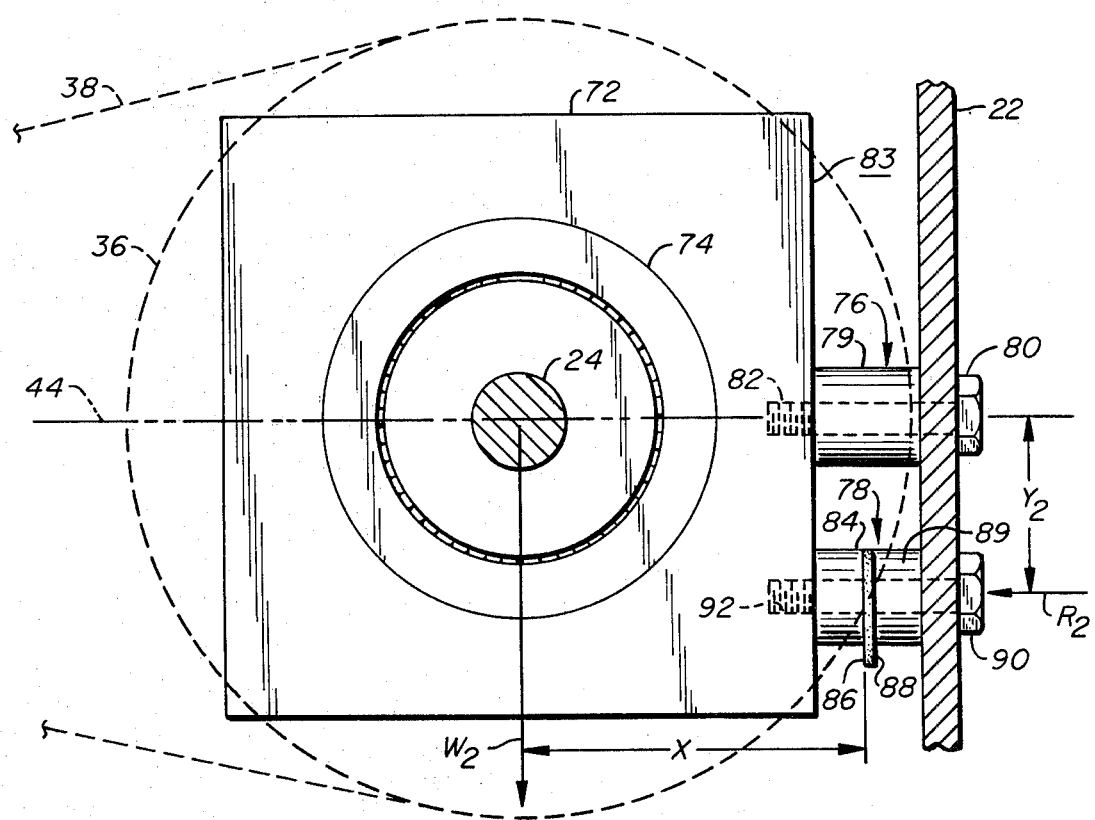
FIG._4.

WHEEL BALANCER TRANSDUCER MOUNT WITH IMPROVED SIGNAL TO NOISE RATIO

BACKGROUND OF THE INVENTION

1. Field of the Invention

This invention relates to a dynamic wheel balancer and more particularly to a transducer mount for such wheel balancer which affords an improved signal to noise ratio.

2. Description of the Prior Art

U.S. Pat. No. 3,636,773 discloses an arrangement for a dynamic wheel balancer having a shaft at one end of which is a mount for a wheel/tire assembly. Spaced along the shaft at different distances from the wheel/tire assembly are transducers which produce electric signals proportional to forces imposed on the shaft by unbalanced forces in the wheel/tire assembly. The amount and location of the unbalanced forces can be ascertained by combining the electrical outputs of the transducer so as to measure the moments produced by the unbalanced wheel condition. The unbalanced condition of the wheel/tire assembly is compensated for by addition of weights at appropriate locations on the wheel rim. Although the apparatus described in the '773 patent is apparently satisfactory, it is unduly expensive and complex.

Copending, commonly owned application for U.S. patent, Ser. No. 128,946, filed Mar. 10, 1980, discloses a transducer mounting assembly which provides electrical outputs equivalent to those produced by the apparatus disclosed in the '773 patent. The transducer mount disclosed in the above cited copending application is much less complex than that disclosed in the '773 patent or in any other presently known prior art.

SUMMARY OF THE INVENTION

In dynamic wheel balancers with which the present invention is particularly suited there are transducers at spaced apart locations on the shaft to which the wheel/tire assembly is attached, one of the transducers being relatively close or proximate to the wheel/tire assembly and the other transducer being relatively remote therefrom. The force produced on the remote transducer in response to the moment produced by the unbalanced force in the wheel/tire assembly is relatively small because of the substantial distance between the transducer and the unbalanced force in the wheel/tire assembly. Contrariwise, the transducer closest to the wheel receives a relatively large force from such moment and in order to derive from the transducer outputs the signals needed to produce information regarding the magnitude and location of the unbalanced forces, it is necessary that the transducer outputs be equalized. Such equalization can be achieved either by amplifying the signal produced by the remote transducer, an expedient which also amplifies noise, or attenuating the amplitude of the proximate transducer, an expedient that adversely affects accuracy.

According to the present invention there is a rigid housing in which resides a proximate bearing block and a remote bearing block. The bearing blocks are supported in the housing by pairs of mounts, one of the mounts of each pair being an active mount which includes a transducer and the other mount being a passive mount. In response to unbalanced forces induced in the shaft by unbalanced forces in the wheel/tire assembly attached to the shaft, moments are created about each of the passive mounts. The spacing between the passive mount and the active mount in the remote bearing block is less than the spacing between the passive mount and the active mount in the proximate bearing block so that force imposed on the remote transducer is greater than force imposed on the proximate transducer.

Many, if not most, dynamic wheel balancers include a shaft which is driven by a motor through a belt or like drive train which cooperates with the shaft at a location thereon remote from the end on which the wheel/tire assembly is mounted. The drive train inevitably imparts vibration to the shaft which is manifested by noise in the signals produced by the transducers. The vibrations arise from nonuniform belts and/or unbalanced conditions in the motor that drives the belt. The effect of such vibrations is ameliorated by a transducer mount of the present invention. The drive typically approaches the shaft from a given direction along an imaginary line. The above noted remote passive transducer is mounted on such imaginary line so that the vibrations produced by unbalanced conditions in the drive train do not materially affect the forces applied to the active mount which contains the transducer.

The objects, features and advantages of the present invention will be more apparent after referring to the following specification and the accompanying drawings.

BRIEF DESCRIPTION OF THE DRAWINGS

FIG. 1 is a perspective view of a portion of one form of wheel balancer with which the present invention can be used to advantage.

FIG. 2 is a view taken on a horizontal plane through the center of the shaft shown in FIG. 1, the view being substantially along line 2—2.

FIG. 3 is a view transverse of the shaft taken substantially along line 3—3 of FIG. 1 and showing the proximate transducer mount.

FIG. 4 is a view transverse of the shaft taken substantially along line 4—4 of FIG. 1 and showing the remote transducer mount.

DESCRIPTION OF THE PREFERRED EMBODIMENT

Referring more particularly to the drawings, reference numeral 12 indicates a cabinet or base on which the wheel balancing mechanism is supported. Rigid with base 12 is a housing 14 which is a rigid, nondeformable member such as a hollow square or box section composed of a top wall 16, a bottom wall 18 and side walls 20 and 22.

Supported centrally of housing 14 is a shaft 24 having opposite ends which extend beyond the longitudinal extremities of the housing. At one end of shaft 24 is mounted a flange 26 with which a conventional cone fitting 28 cooperates to secure to flange 26 and shaft 24 a wheel/tire assembly 30 which is composed of a vehicle wheel 32 and a tire 34 mounted on the rim of the wheel. The wheel/tire assembly is typically unbalanced due to manufacturing imperfections and the like, and the unbalanced condition in the wheel imparts forces on shaft 24 as the shaft and the wheel assembly are rotated.

On the end of shaft 24 remote from flange 26 is secured a drive sheave 36, the periphery of which is engaged by a drive belt 38. The end of drive belt 38 remote from sheave 36 is trained around a sheave 40 which is carried on and driven by the shaft 41 of a motor 42. Consequently, in response to rotation of sheave 40 by motor 42, shaft 24 and wheel/tire assembly 30 are rotated.

Belt 40 coacts with shaft 24 in a direction radially of the shaft, such direction being along an imaginary line indicated at 44 in FIG. 4, which extends between the axis of shaft 24 and shaft 41 of motor 42. Thus any spurious forces or vibrations imposed on shaft 24 by virtue of nonuniformity along belt 38 or imbalances within motor 42 affect shaft 24 along imaginary line 44. As will appear, the transducer mount of the invention reduces or eliminates any adverse effect from such spurious vibrations.

At a site near the right-hand extremity of housing 14 and proximate wheel/tire assembly 30 is a proximate bearing block 46. Proximate bearing block 46 supports the outer race of a bearing 48, the inner race of which supports shaft 24 so that the shaft can freely rotate with respect to the bearing block. As can be seen in FIG. 3, bearing block 46 has a generally square shape and is sized to fit within housing 14 in spaced apart relation to the internal surfaces of the walls of the housing. Bearing block 46 is fixed to wall 22 by means of a passive mount 50 and an active mount 52.

Passive mount 50 includes a cylindrical shaped spacer 54 which defines a central bore. Extending through the bore is a threaded bolt 56 which is engaged in a threaded hole 58 formed in a side surface 59 of bearing block 46. The opposite ends of spacer 54 are flat and are perpendicular to the axis of bolt 56 so that when the bolt is tightened, passive mount 50 firmly secures bearing block 46 to the housing of which wall 22 is a part.

Active mount 52 includes a piezoelectric body 60, a conductive electrode layer 62, an insulative body 64 on which the electrode layer is laminated and a rigid spacer 66. Piezoelectric body 60 and spacer body 66 have a circular cross section corresponding to that of spacer 54. Electrode layer 62 and insulative body 64 have a similar circular shape in addition to a radially extending tab to afford electrical connection to the conductive electrode layer so that the voltage produced on the electrode in response to application of compressive and tensive forces to piezoelectric body 60 can be connected to external circuitry not shown. The elements that constitute active mount 52 are centrally bored to received therethrough a threaded bolt 68 which is threaded into a threaded hole 70 in side surface 59 of bearing block 46.

Bearing block 46 and active mount 52 are constructed so that the distance from conductive layer 62 to the center line of shaft 24 in a direction perpendicular to wall 22 is identified as X; the distance between the center lines of the passive mount 50 and active mount 52 is identified as $Y_1$, which in the embodiment shown in the drawings is equal to X.

Adjacent the opposite end of housing 14, remote from wheel/tire assembly 30, is a remote bearing block 72 which has an outlinear shape corresponding to that of bearing block 46 and a centrally located bearing 74 similar to bearing 48 so that the remote end of shaft 24 is supported for rotation therein. Bearing block 72 is supported on wall 22 of housing 14 by a passive spacer 76 and an active spacer 78.

Passive mount 76 is substantially identical to passive mount 50 described previously and includes a rigid cylindrical body 79 which defines a central bore for receiving therethrough a bolt 80 which is threaded into a threaded hole 82 in a side surface 83 of bearing block 72.

Active mount 78 is substantially identical to active mount 52 described previously and includes a piezoelectric body 84, a conductive electrode layer 86 laminated to an insulative body 88, and a rigid spacer 89. As in the case with passive mount 52, the members are centrally bored to receive a threaded bolt 90 therethrough and surface 83 of bearing block 72 is provided with a threaded hole 92 to receive the bolt.

Conductive electrode 86 is spaced from the center of shaft 24 by the distance X; the distance between the center lines of mounts 76 and 78 are spaced from one another by a lesser distance indicated at $Y_2$ in FIG. 4. In the specific example shown in the drawings, $X=2Y$.

The central axis of threaded hole 82 is coaxial with imaginary line 44 so that spurious vibrations induced by nonuniformities in belt 38 or unbalanced conditions in motor 42 are applied axially of passive spacer 76 so as not to produce any significant moment about the passive spacer. Consequently, the spurious vibrations will have little or no effect on piezoelectric body 84 in active mount 78.

Referring to FIG. 2, it will be seen that the distance from a point on wheel/tire assembly 30 (for example, the inner edge of the rim of wheel 32) is spaced by a distance $L_1$ from the center line of proximate mounts 50 and 52. The distance between the mounts for proximate bearing block 46 and the mounts for remote bearing block 72 is indicated at $L_2$. As is well known and described in such prior art references as U.S. Pat. No. 3,636,773, a moment produced by an unbalanced condition in wheel/tire assembly 30 will induce a force on bearing block 46 that has a magnitude inversely proportional to $L_1$ and a force on bearing block 72 that has a magnitude inversely proportional to $L_1+L_2$. In other words, a given unbalanced condition on wheel/tire assembly 30 has a much lesser effect on bearing block 72 than on bearing block 46 because bearing block 72 is more remote from the wheel/tire assembly. Although the direction of the forces on the bearing blocks continuously changes as the wheel/tire assembly rotates, the directions indicated in FIGS. 3 and 4 by downward extending arrows represent the direction of the force at one point during rotation. The arrow in FIG. 3 represents a force $W_1$ and the arrow in FIG. 4 represents a force $W_2$. In virtually all instances, $W_1$ exceeds $W_2$.

In response to the force $W_1$ a moment about a point within passive spacer 50 will be introduced. The magnitude of the moment is $W_1 \times X$ and the moment will tend to compress piezoelectric body 60. The piezoelectric body will resist the moment by a reaction force in a direction indicated by arrow $R_1$, which is at a vertical distance $Y_1$ from passive mount 50. Thus, $$W_1 \times X = R_1 \times Y_1.$$

Substituting $Y_1 = X$ and solving for $R_1$, $$R_1 = (W_1 \times X)/Y_1 = (W_1 \times X)/X = W_1.$$

Referring to FIG. 4, the moment produced on the remote bearing block by $W_2$ equals $W_2 \times X$. Such moment acts in a counterclockwise direction which compresses piezoelectric body 84. The moment is resisted by a reaction force directed as indicated by arrow $R_2$ which is spaced at a distance $Y_2$ from passive mount 76. Thus, $$W_2 \times X = R_2 \times Y_2.$$

Substituting $Y_2 = X/2$ and solving for $R_2$, $$R_2 = (W_2 \times X)/Y_2 = (W_2 \times X)/(X/2) = 2W_2.$$

From the foregoing analysis it will be seen that the force imposed on piezoelectric body 84 which forms a part of remote active mount 78 is twice the force imposed on piezoelectric body 60 of proximate active mount 52 in the case where $W_1 = W_2$. As has been stated above, however, $W_2$ is typically less than $W_1$ but the electrical output of remote active mount 78 is nonetheless substantial because of a multiplication factor of $Y_1/Y_2$ ($Y_1/Y_2 = 2$ in the specific case shown in the drawings).

The electrical signal produced by remote active mount 78 has virtually no noise content due to spurious vibrations arising from any unbalanced conditions existing in belt 38 or motor 42. Such is the case because any unbalanced forces or vibrations produced by the belt or the motor act along imaginary line 44 which is coaxial of passive spacer 76. Accordingly, the vibrations produce no moment in bearing block 72 and therefore have no effect on remote active mount 78.

It is essential that remote passive mount 76 and remote active mount 78 be disposed on the side of bearing block 72 that is perpendicular to imaginary line 44. In the case of proximate passive mount 50 and proximate active mount 52 which support proximate bearing block 46, however, these proximate mounts can be located on any interior surface of housing 14 or any side surface of bearing block 46. Mounting the proximate mounts at a position different from that shown in FIG. 3 will simply alter the phase between the signal produced by proximate active mount 52 and remote active mount 78; any phase change can be compensated for electronically.

Thus it will be seen that the present invention provides a transducer mount for a wheel balancer which has an excellent signal to noise ratio and which is arranged so that the electrical output of the remote transducer has sufficient magnitude that it can be processed without undue amplification thereof. These advantageous characteristics are achieved in a structure that is composed of relatively few inexpensive parts and is accordingly inexpensive and reliable.

Although one embodiment of the invention has been shown and described, it will be obvious that other adaptations and modifications can be made without departing from the true spirit and scope of the invention.

What is claimed is:

1. In a wheel balancer of the type including a shaft having a proximal end and a remote end remote from said proximal end, means for mounting a wheel/tire assembly on said shaft adjacent said proximal end, a drive train coupled to said remote end for imparting rotation to said shaft and said wheel/tire assembly, said drive train coacting with said shaft along an imaginary line that extends in a given direction radially of said shaft, proximal and remote bearing blocks disposed adjacent respective said ends of said shaft, and bearings mounted in respective said bearing blocks for supporting said shaft for rotation relative thereto, improved mounting apparatus for said bearing blocks comprising a rigid support member defining a substantially nondeformable surface, means for supporting said surface on the side of said shaft opposite said given direction and substantially perpendicular to said imaginary line, a remote passive mount for supporting said remote bearing block in spaced apart relation to said surface, said remote passive mount being disposed in coaxial alignment with said imaginary line so that vibratory motion imparted to said remote bearing block by said drive train produces no significant moment about said remote passive mount, a remote active mount extending between said surface and said remote bearing block at a point spaced from said remote passive mount by a first distance so that said remote active mount is subjected to alternate compressive and tensive forces in response to rotation of an unbalanced wheel/tire assembly mounted on the second end of said shaft, said remote active mount including transducer means for producing an electric signal that varies as a function of said compressive and tensive forces, and means for mounting said proximal bearing block to said rigid support member, said proximal bearing block mounting means including transducer means for producing an electrical signal indicative of forces imparted to said proximal bearing block in response to rotation of an unbalanced wheel/tire assembly mounted on the second end of said shaft.

2. Mounting apparatus according to claim 1 wherein said proximal bearing block mounting means comprises a proximal passive mount for supporting said proximal bearing block in spaced apart relation to said surface, a proximal active mount extending between said proximal bearing block and said surface, said proximal active mount including said transducer means, said proximal active mount being spaced from said proximal passive mount by a second distance greater than said first distance so that forces applied to said remote active mount in response to the moment about said remote passive mount produced by unbalanced forces on said shaft are greater than forces applied to said proximal active mount in response to the moment about said proximal passive mount produced by equivalent unbalanced forces on said shaft.

3. Mounting apparatus according to claim 2 wherein said second distance is substantially twice said first distance.

4. Mounting apparatus according to claim 2 wherein said proximal active mount and said proximal passive mount are spaced substantially symmetrically of an imaginary plane defined by the axis of said shaft and said given direction.

5. Mounting apparatus according to claim 2 wherein said substantially nondeformable surface is a plane surface, wherein each of said bearing blocks has a planar side surface parallel to the axis of said shaft, and wherein said mounts are dimensioned to support said side surfaces in parallelism with said plane surface.

6. In a wheel balancer of the type including a shaft having a proximal end and a remote end remote from said proximal end, means for mounting a wheel/tire assembly on said shaft adjacent said proximal end, a drive train coupled to said remote end for imparting rotation to said shaft and said wheel/tire assembly, said drive train coacting with said shaft along an imaginary line that extends in a given direction radially of said shaft, proximal and remote bearing blocks disposed adjacent respective said ends of said shaft, and bearings mounted in respective said bearing blocks for supporting said shaft for rotation relative thereto, improved mounting apparatus for said bearing blocks comprising a rigid support member defining a substantially nondeformable surface, means for supporting said surface on the side of said shaft opposite said given direction and substantially perpendicular to said imaginary line, a remote passive mount for supporting said remote bearing block in spaced apart relation to said surface, said remote passive mount being disposed in coaxial alignment with said imaginary line so that vibratory motion imparted to said remote bearing block by said drive train produces no significant moment about said remote passive mount, a remote active mount extending between said surface and said remote bearing block at a point spaced from said remote passive mount by a first distance so that said remote active mount is subjected to alternate compressive and tensive forces in response to rotation of an unbalanced wheel/tire assembly mounted on the second end of said shaft, said remote active mount including transducer means for producing an electric signal that varies as a function of said compressive and tensive forces, a proximal passive mount for supporting said proximal bearing block in spaced apart relation to said surface, a proximal active mount extending between said proximal bearing block and said surface, said proximal active mount including transducer means for producing an electric signal that varies as a function of said compressive and tensive forces thereon, said proximal active mount being spaced from said proximal passive mount by a second distance greater than said first distance so that forces applied to said remote active mount in response to the moment about said remote passive mount produced by unbalanced forces on said shaft are greater than forces applied to said proximal active mount in response to the moment about said proximal passive mount produced by equivalent unbalanced forces on said shaft.

* * * * *